E. A. JONES.
ROUTE INDICATOR MECHANISM.
APPLICATION FILED JULY 29, 1913.
1,092,147.
Patented Apr. 7, 1914.
2 SHEETS—SHEET 1.
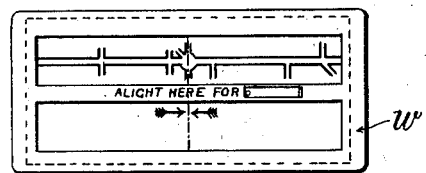
Fig. 1.
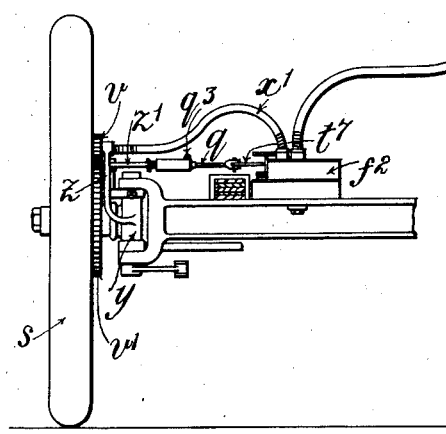
Fig. 2.
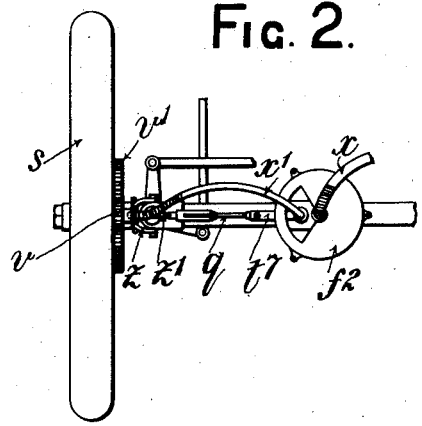
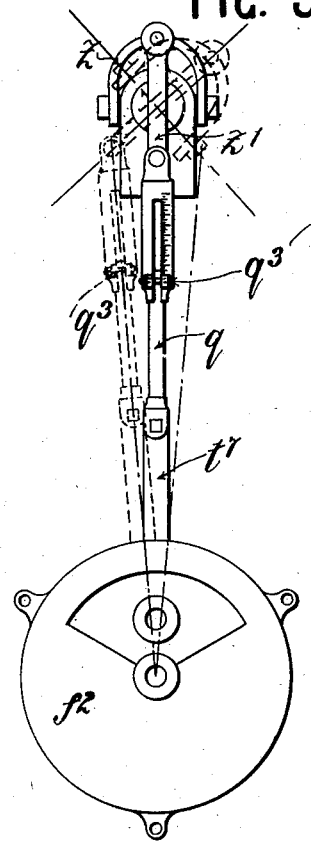
Fig. 5.
WITNESSES
INVENTOR
E. A. Jones.
per Percy H. Moore
Attorney

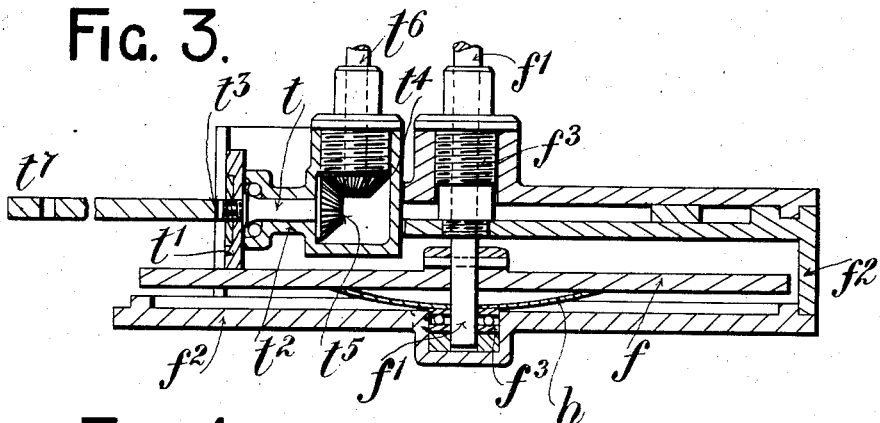

UNITED STATES PATENT OFFICE.

ERNEST ALBERT JONES, OF NEW YORK, N. Y.

ROUTE-INDICATOR MECHANISM.

1,092,147.  Specification of Letters Patent.  Patented Apr. 7, 1914.

Application filed July 29, 1913. Serial No. 781,806.

*To all whom it may concern:*

Be it known that I, ERNEST ALBERT JONES, a citizen of the United States of America, whose residence is at 27 Pine street, in the city of New York, N. Y., but temporarily residing at 9 Heath Mansions, Hampstead, in the administrative county of London, England, have invented certain new and useful Improvements in and Relating to Route-Indicator Mechanism, of which the following is a specification.

This invention relates to route indicators and the like for public service vehicles and particularly to those capable of being steered to direct their course, such for instance as motor omnibuses, and it has for its object to compensate automatically for the increased distance traveled by such vehicles owing to the impossibility of steering them in such a manner that they travel in a direct course on their route. I attain this end by introducing in the transmission gear employed to drive the mechanism of the indicator or the like a compensating device which consists of a variable gearing of the gradual progressive type, the shifting mechanism of which is coupled to the steering medium or mechanism of the vehicle in such a manner that when the vehicle is running other than in its direct course the variable gearing is operated to reduce the speed of the indicator in relation to the speed of the vehicle.

In the accompanying drawing which shows this invention adapted for use on road vehicles:—Figures 1 and 2 are diagrammatic views in elevation and plan respectively showing the general construction and arrangement of the mechanism, Fig. 3 is a view in sectional elevation—on an enlarged scale—of the compensating gear, Fig. 4 is a broken view in plan thereof, and Fig. 5 is a view in plan showing means whereby the apparatus can be calibrated.

Throughout the views similar parts are marked with like letters of reference.

Referring to Figs. 3 and 4 of the accompanying drawing, the variable gearing comprises a friction disk $f$ fixed on a shaft $f^1$ which is mounted in suitable bearings $f^3$ carried by the case $f^2$, said case being mounted on any suitable part of the chassis or frame of the vehicle in juxtaposition to the steering wheel from which the motion is to be obtained, said shaft $f^1$ being coupled to the driving gear of the indicator $w$ by a flexible shaft $x$. Mounted at right angles to the shaft $f^1$ is another shaft $t$ which carries a friction disk $t^1$ adapted to contact the friction disk $f$. The shaft $t$ is mounted in a bearing $t^2$ carried by a plate $t^3$ which is so mounted in relation to the case $f^2$ as to be capable of being moved radially in respect to the axis of the disk $f$ for the purpose of varying the speed ratio between the said two disks. The two friction disks are kept in contact by any suitable arrangement of springs; a convenient one is that shown in Fig. 3 which consists of a plate spring $h$ operating between the back of the disk $f$ and the bearing $f^3$. The shaft $t$ is driven by a shaft $t^6$ through bevel pinions $t^4$ and $t^5$, and said shaft $t^6$ is coupled to one of the road wheels by a flexible shaft $x^1$ and spur gearing such as $v$ $v^1$.

On the pivot $y$ of one of the steering wheels $s$ of the vehicle is fixed a bracket $z$ which carries an arm $z^1$ which is coupled to an extension $t^7$ of the sliding plate $t^3$ by means of a link $q$, the construction and arrangement being such that angular movement of the arm $z^1$ on either side of its central position draws the plate $t^3$ carrying the friction disk $t^1$ farther away from the center of the disk $f$ so that movement of the steering wheel $s$ on either side of its central position for the straight running of the vehicle operates to reduce the speed of the route indicator mechanism in relation to the speed of the vehicle and thereby prevent the route indicator from over-running the vehicle.

To enable the apparatus to be calibrated, the link $q$ is made adjustable in length whereby the normal distance of the friction disk $t^1$ from the center of the friction disk $f$ can be varied as desired. The link $q$ is made in two parts arranged to telescope one within the other, the outer part being provided with a suitable clamping device such as the split collar $q^3$. The two relative adjustable parts of the link $q^1$ may be provided with a suitable scale and pointer respectively.

It will be understood that this invention although particularly adapted for self or mechanically propelled road vehicles is also applicable to all other forms of public service vehicles and the like capable of being steered and not adapted to run in or on fixed tracks.

I wish it to be understood that I do not limit the application of this invention to route indicators as it may be applied to all other forms of indicators employed in connection with public service vehicles, such for instance as those employed to denote the distance traveled by the vehicle. I further do not limit myself to the precise details of construction herein specified, but hold myself at liberty to make such changes and alterations as fairly fall within the spirit and scope of my invention.

What I claim as my invention and desire to secure by Letters Patent is:—

1. A compensating device for the driving mechanism of route indicators and the like employed on vehicles capable of being steered to direct their course, comprising a variable speed gearing of the gradually progressive type, and means for operating said gearing from the steering medium or mechanism so as automatically to reduce the speed of the indicator in relation to the speed of the vehicle when the vehicle deviates from its direct course.

2. The combination with a vehicle capable of being steered and a route indicator or the like carried by said vehicle, of mechanism for imparting positive motion to said indicator from mechanism of the vehicle, of a variable speed gearing of the gradually progressive type interposed in said motion imparting mechanism, and of means for automatically changing the speed ratio of said gearing as and when the steering medium or mechanism of the vehicle is manipulated to cause the vehicle to deviate from its straight or direct course.

3. The combination with a vehicle capable of being steered and a route indicator or the like carried by said vehicle, of mechanism for imparting motion to said indicator from mechanism of the vehicle, of a variable speed gearing of the gradually progressive type interposed in said motion imparting mechanism, of means for automatically changing the speed ratio of said gearing as and when the steering medium or mechanism of the vehicle is manipulated to cause the vehicle to deviate from its straight or direct course, and of means for calibrating the apparatus.

In testimony whereof I have signed my name in the presence of two subscribing witnesses.

ERNEST ALBERT JONES.

Witnesses:
J. H. HANES,
E. G. GORDON.